United States Patent [19]

Hsu et al.

[11] Patent Number: 4,546,882
[45] Date of Patent: Oct. 15, 1985

[54] PACKAGE HAVING OIL-CONTAINING PRODUCT

[75] Inventors: Joseph C. Hsu, Neenah; George O. Schroeder; Robert A. Steen, both of Appleton, all of Wis.

[73] Assignee: American Can Company, Greenwich, Conn.

[21] Appl. No.: 464,692

[22] Filed: Feb. 7, 1983

[51] Int. Cl.⁴ .............................................. B65D 73/00
[52] U.S. Cl. ................................. 206/484; 206/524.2; 206/525
[58] Field of Search ................... 206/525, 524.2, 484; 229/3.5 R

[56] References Cited

U.S. PATENT DOCUMENTS

| | | | |
|---|---|---|---|
| 2,781,900 | 2/1957 | Snyder et al. | 206/525 |
| 3,770,122 | 11/1973 | Thiele | 206/524.2 |
| 3,775,239 | 11/1973 | Snow | 206/484 |
| 4,085,244 | 4/1978 | Stillman | 206/484 |
| 4,147,291 | 4/1979 | Akao . | |
| 4,355,721 | 10/1982 | Knott et al. | 206/484 |
| 4,360,550 | 11/1982 | Asakura . | |
| 4,386,124 | 5/1983 | Akao | 206/524.2 |
| 4,405,667 | 9/1983 | Christensen et al. | 206/484 |

FOREIGN PATENT DOCUMENTS

| | | | |
|---|---|---|---|
| 74161 | 6/1982 | European Pat. Off. | 206/484.2 |
| 79684 | 7/1978 | Japan | 206/484 |

Primary Examiner—Joseph Man-Fu Moy
Attorney, Agent, or Firm—Stuart S. Bowie; Thomas D. Wilhelm

[57] ABSTRACT

An improved package, including an oil-containing product, includes a multiple layer packaging sheet material which is free from cockling. The multiple layer sheet material includes a layer which is susceptible to being swelled when in contact with oil, giving a cockled appearance. With reference to the package structure, the sheet material also includes an oil barrier layer between the oil-containing product and the layer which is susceptible to being swelled when in contact with oil. The barrier layer comprises either nylon or ethylene vinyl alcohol.

10 Claims, 3 Drawing Figures

4,546,882

PACKAGE HAVING OIL-CONTAINING PRODUCT

BACKGROUND OF THE INVENTION

This invention relates to the packaging of products containing oils in packages using flexible sheet materials. This invention is particularly applicable to such products which are sensitive to moisture, and which require that the package material serve to protect them from infusion of moisture from the outside environment. Such products have conventionally been packaged in glassine-based sheet structures. More recently, all-plastic structures have been used to advantage to improve product quality through increased protection from infusions from the outside environment. The industry has been struggling with the problem that certain ones of the plastic packaging structures, while providing excellent protection to the product, are cockling at some point during the normal shelf life of the product. The term cockling as used herein means to have ripples or puckers, usually due to some uneven tension, and the uneven tension yielding a surface that is not smooth, but, rather, is uneven and wavy.

Thus it is an object of this invention to provide a package having a plastic sheet structure which does not cockle upon contact with oil.

It is another object to provide, in such a package, good protection from gaseous infusions from the outside environment; especially infusions of oxygen and moisture vapor.

SUMMARY OF THE INVENTION

The inventors have surprisingly found that the problem of cockling can be associated with one of the more desirable barrier materials in a multiple-layer film, namely high density polyethylene (HDPE). HDPE is an excellent, and economical barrier to transmission of water vapor. The inventors have discovered, however, that an HDPE layer in the film is responsible for the observed cockling. They have discovered that, in packages of oil-containing products such as potato chips, at places where the chips touch the packaging material, oil is transferred from the chips to the surface of the packaging material. Their discoveries show that this oil can penetrate certain of the packaging material layers. In conventional packaging materials, the oil was able to penetrate to the HDPE layer. The HDPE layer would absorb the oil, and retain it, creating localized swellings in the HDPE layer, wherever the oil-containing product touched the packaging material. These localized swellings manifested themselves as cockling of the packaging material.

After extensive studies of multiple layer sheet materials in the packaging of oil-containing products, the inventors have discovered a family of multiple-layer packaging sheet materials which do not cockle when used to package oil-containing products. The sheet materials have in common a first layer which is susceptible to absorption of oil and swelling upon absorption of the oil. This first layer usually comprises HDPE. A second layer is positioned such that, in the package, it is between the first layer and the product. The second layer, which comprises either nylon or ethylene vinyl alcohol copolymer (EVOH), functions as a barrier to transmission of the oil, so that it never reaches the first layer.

In preferred packages, the layer on the interior surface of the packaging sheet material is a heat sealable layer, and the package is sealed closed by heat seals.

For purposes of enhancing the appearance and durability of the package, it is usually desirable to have an abuse resistant layer on the outside of the package, such as oriented polypropylene (OPP) or oriented polyester.

In structuring the entire sheet material, those skilled in the art recognize that compatible adhesive materials should be selected, to ensure good interfacial adhesions and thus a good structural integrity of the packaging material. The complete structure in the most preferred form, comprises, from the outside of the package inwardly: an abuse resistant layer, a layer susceptible to cockling due to oil absorption, an oil barrier layer, and a heat sealable layer.

DETAILED DESCRIPTION OF THE INVENTION

Figure 1:
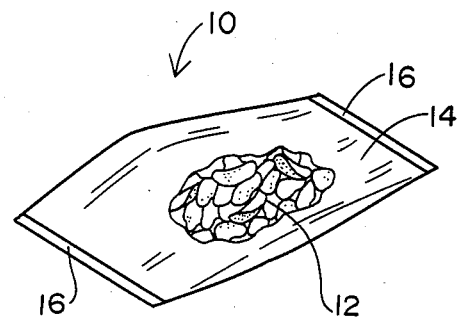
FIG. 1 shows a pictorial view of a package of this invention, with part of the packaging material cut away to show the enclosed product.

Turning now to the invention in detail, FIG. 1 represents a typical application of the packaging of the invention. A package 10 includes the oil-containing product 12, in this case shown as potato chips, and the enclosing flexible packaging film 14. The package is heat sealed closed along one longitudinal seam, not shown, and by heat seals 16 on each end of the package.

Figure 2:
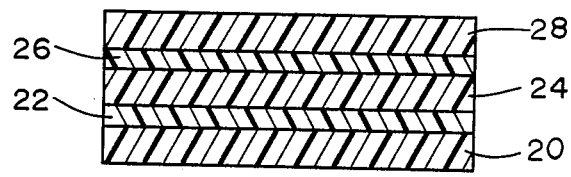
FIG. 2 shows a cross-section of one embodiment of the packaging sheet material of the invention.
Figure 3:
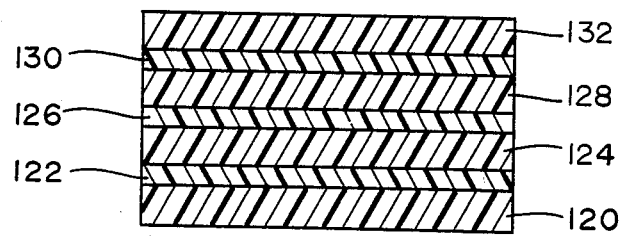
FIG. 3 shows a cross-section of a second embodiment of the packaging sheet material of the invention.

FIGS. 2 and 3 show two illustrative cross-sections of sheet structures useful in this invention. Referring now to FIG. 2, layer 20 is a heat sealable layer and forms the seals necessary in making the bag. Layer 22 is a first adhesive layer. Layer 24 is a layer which serves, for purposes of the invention, as a barrier to transmission of oil through the package structure. Layer 26 is a second adhesive layer. Layer 28 is a material which is susceptible to absorbing oil and which swells upon absorption of the oil.

Addressing now each layer in detail, the packages of this invention all have in common a layer whose composition is susceptible to absorption of oil and swelling upon that absorption. In the FIG. 2 structure, that layer is layer 28. As illustrated in the following examples, the layer 28 composition is usually HDPE. Blends of HDPE also exhibit the same susceptibility, at least to some degree. Other polymers may exhibit the same problem of susceptibility. It would then be obvious to use the same solution herein described.

Layer 24 functions as a barrier to transmission of oil through the packaging sheet material. Preferred materials for provision of the barrier function are any of the conventionally available EVOH copolymers and nylon polymers. Metal foil is also acceptable as a functional material but is normally not preferred because of cost.

Layer 20 is a heat sealable composition which may be selected with substantial freedom, as the sealant layer usually does not significantly affect the solution of the cockling problem. Illustrative of those sealants which may be selected are ethylene vinyl acetate (EVA), ionomers, polyethylenes and polypropylenes.

Adhesive layers 22 and 26 are selected for their ability to provide good interfacial adhesion at their relative layer interfaces. Those skilled in the art of multiple layer polymer films will recognize those adhesive polymers which can be used to advantage to ensure good interlayer adhesion. Typical adhesives are olefin based polymers and copolymers, usually having some carboxyl-type modifications. Examples of these are those sold under the trade names of Admer, Plexar, CXA, and AP. Where a metal foil barrier layer is used, other adhesives may be desirable, for example olefinic ester polymers, sometimes combined with special surface or primer treatments. Again, though, skilled artisans can make appropriate adhesive selections based on existing conventional technology, and given the compositions selected for layers 20, 24 and 28.

It is possible, in some structures, to so select the composition of adhesive layer 22 such that it serves not only as an adhesive to layer 24 but can also serve as a sealant layer, in which case layer 20 is unnecessary.

It is also entirely possible to print the sealant composition in a pattern, whether it be layer 20 or layer 22, onto only those portions of the adjacent layer as will be involved in the formation of seals.

FIG. 3 represents a structure similar in all respects to the FIG. 2 structure with two added layers 130 and 132. Thus the 100 series numbered layers in FIG. 3 correspond to the double digit numbered layers in FIG. 2. Layer 120 is a sealant layer. Layer 124 serves as a barrier to oil transmission. Layer 128 is susceptible to oil. Layers 122, 126, and 130 are adhesive layers. Layer 132 is usually added to provide abuse resistance, and may impart some other desirable characteristics such as stiffness and gloss. One is free to choose, for layer 132, virtually any composition that will serve the identified purpose. Most commonly used are OPP and oriented polyester. The composition of layer 130 may commonly be selected independent of the compositions of layers 122 and 126; with the provision that it serve the function of adhering layer 132 to layer 128.

It should be appreciated that the structures herein discussed and illustrated represent a rather simple form of the invention. It is clearly within the scope of the invention to provide other layers in the packaging structure, so long as the relative positions of the susceptible layer and the barrier layer are preserved, such that the barrier layer is located between the susceptible layer and the oily product.

In some of the simple forms of the invention described herein such as the structure in FIG. 2, it is understood that the packaging structure is protected from only one side, namely the side of the structure which will be in contact with oil in the product inside the package. Thus oil contact from outside the package will still cause the swelling and cockling problem. If such oil contact is contemplated an additional barrier layer can be added between the oil susceptible layer and the outside of the package.

The multiple layer packaging structures used in this invention can be made by a variety of conventional processes and combinations of processes. Typical of the useful processes are extrusion, coextrusion and extrusion lamination.

EXAMPLE 1

A structure of the nature of that shown in FIG. 2 was made by the coextrusion process, using four extruders. The four extruders processed four different polymer compositions and fed them to a coextrusion die apparatus which converted the melt streams to a five layer film. Referring now to FIG. 2, and correlating the five layer film of this example, layer 28 was HDPE. Layer 24 was EVOH having 40% ethylene. Layer 20 was a blend of ionomer, EVA and HDPE. Layers 22 and 26 were carboxymodified LDPE; and they resulted from the splitting, in the die, of the stream from one extruder into two parts to form two layers. The final film, based on layer thickness was 50% HDPE, 10% EVOH, 20% sealant layer blend and 10% for each of the LDPE adhesive layers.

EXAMPLE 2

A coextruded 5 layer film was made as in EXAMPLE 1, except that the adhesive layers 22 and 26 were anhydride-modified medium density polyethylene.

EXAMPLE 3

A coextruded film was made as in EXAMPLE 2 except that the EVOH copolymer was 45% ethylene.

EXAMPLE 4

A structure of the nature of that shown in FIG. 2 was made by the coextrusion process, using four extruders. The four extruders processed four different polymer compositions and fed them to a coextrusion die apparatus which converted the melt streams to a five-layer film. Layer 28 was a blend of 50% HDPE and 50% linear low density polyethylene (LLDPE). Layer 24 was nylon. Layer 20 was a blend of ionomer and EVA, and slip and anti-block additives. Layers 22 and 26 were anhydride modified EVA. The final structure was 2 mils thick, with 60% of the thickness in layer 28, 10% in layer 24, 15% in layer 20 and 7.5% in each of layers 22 and 26.

In each of the above examples, layers 24 and 28 each included 15% color concentrate as a blend additive.

EXAMPLES 5, 6, 7 and 8

A 0.75 mil film of OPP was extrusion laminated to layer 28 of samples of each of the five layer films of EXAMPLES 1-4, using LDPE as the extrusion laminant; to make seven layer films, as shown in FIG. 3.

Each of the films in EXAMPLES 1-8 was used to package potato chips in pouch-type bags as illustrated in FIG. 1. The packages were stored under accelerated aging conditions at a controlled temperature of 100° F., and checked periodically for evidence of cockling. After the normally accepted test period of 48 hours, none of the packages showed any cockling. A control package using a conventional film of the structure /OPP/LDPE/EVOH/adhesive/HDPE/HDPE/-
  Sealant/ showed objectionable cockling after 48 hours in the same test conditions. The packages made from the films of EXAMPLES 1-8 were left under accelerated aging conditions for periods of 88 to 109 days and showed no evidence of cockling.

Having thus described the invention, what is claimed is:

1. A package comprising a multiple layer flexible packaging sheet material and an included product therein containing an oil, said flexible sheet material comprising:

(a) a first layer susceptible to absorption of said oil and swelling upon said absorption of said oil the composition of said first layer being selected from the group consisting of high density polyethylene and blends of high density polyethylene; and (b) a second layer, between said first layer and said product, said second layer being functional as a barrier to transmission of said oil, said second layer being chosen from the group consisting of ethylene vinyl alcohol and nylon.

2. A package as in claim 1 and including a third layer, said third layer being functional as a barrer to transmission of oil, said first layer being disposed between said third layer and said product and being chosen from the group consisting of ethylene vinyl alcohol and nylon.

3. A package as in claim 1 wherein said first layer comprises high density polyethylene.

4. A package as in claim 2 wherein said sheet material includes a heat sealable layer on the interior of said package, and wherein said package is sealed closed by heat seals.

5. A package as in claim 3 wherein said sheet material includes a heat sealable layer on the interior of said package, and wherein said package is sealed closed by heat seals.

6. A package comprising of flexible packaging sheet material and an included product therein containing an oil, said flexible sheet material comprising, from the outside of said package inwardly:

(a) an oil-sensitive layer susceptible to absorption of said oil and swelling upon said absorption of said oil, the composition of said oil sensitive layer being selected from the group consisting of high density polyethylene and blends of high density polyethylene:

(b) a first adhesive layer;

(c) an oil barrier layer comprising either nylon or ethylene vinyl alcohol;

(d) a second adhesive layer; and (e) a sealant layer.

7. A package comprising a flexible packaging sheet material and an included product therein containing an oil, said flexible sheet material comprising, from the outside of said package inwardly:

(a) an abuse resistant layer;

(b) a first adhesive layer;

(c) an oil-sensitive layer susceptible to absorption of said oil and swelling upon said absorption of said oil, the composition of said oil sensitive layer being selected from the group consisting of high density polyethylene and blends of high density polyethylene;

(d) a second adhesive layer;

(e) an oil barrier layer comprising either nylon or ethylene vinyl alcohol;

(f) a third adhesive layer, and (g) a sealant layer.

8. A package as in claim 1 and including a third layer, said third layer being functional as a barrier to transmission of oil.

9. A package as in claim 8 wherein said sheet material includes a heat sealable layer on the interior of said package, and wherein said package is sealed closed by heat seals.

10. A package as in claim 1 wherein said sheet material includes a heat sealable layer on the interior of said package, and wherein said package is sealed closed by heat seals.

* * * * *